US010679088B1

(12) United States Patent
Dalal et al.

(10) Patent No.: US 10,679,088 B1
(45) Date of Patent: Jun. 9, 2020

(54) VISUAL DOMAIN DETECTION SYSTEMS AND METHODS

(71) Applicant: Proofpoint, Inc., Sunnyvale, CA (US)

(72) Inventors: Gaurav Mitesh Dalal, Fremont, CA (US); Ali Mesdaq, San Jose, CA (US); Sharon Huffner, Berlin (DE); Harold Nguyen, Burlingame, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 189 days.

(21) Appl. No.: 15/430,158

(22) Filed: Feb. 10, 2017

(51) Int. Cl.
| | |
|---|---|
| *G06K 9/20* | (2006.01) |
| *G06K 9/34* | (2006.01) |
| *H04L 29/06* | (2006.01) |
| *H04L 29/12* | (2006.01) |
| *G06K 9/62* | (2006.01) |

(52) U.S. Cl.
CPC ........... *G06K 9/344* (2013.01); *G06K 9/6202* (2013.01); *G06K 9/6215* (2013.01); *H04L 61/1511* (2013.01); *H04L 63/20* (2013.01)

(58) Field of Classification Search
CPC ....... G06K 2209/01; H04N 2201/0039; H04N 2201/3205; H04N 2201/3226
See application file for complete search history.

(56) References Cited

U.S. PATENT DOCUMENTS

| | | | | |
|---|---|---|---|---|
| 5,276,741 | A * | 1/1994 | Aragon | G06F 7/02 382/229 |
| 8,239,333 | B2 * | 8/2012 | Yang | G06F 16/958 706/12 |
| 8,560,477 | B1 * | 10/2013 | Petrov | G06K 9/6224 706/46 |
| 9,239,961 | B1 * | 1/2016 | Cole | G06K 9/00456 |
| 9,268,821 | B2 * | 2/2016 | Hagiwara | G06Q 30/0601 |
| 9,984,166 | B2 * | 5/2018 | Even-Zohar | G06F 16/9535 |
| 10,127,388 | B1 * | 11/2018 | Popuveniuc | G06F 21/64 |
| 10,496,706 | B2 * | 12/2019 | Barouni Ebrahimi | G06F 16/3347 |
| 2003/0233232 | A1 * | 12/2003 | Fosler-Lussier | G10L 15/1815 704/251 |
| 2004/0044791 | A1 * | 3/2004 | Pouzzner | G06F 16/9566 709/245 |

(Continued)

OTHER PUBLICATIONS

Grzegorz Kondrak, N-gram similarity and distance, Proceedings of the Twelfth International Conference on String Processing and Information Retrieval (SPIRE 2005), pp. 115-126, Buenos Aires, Argentina, Nov. 2005.

(Continued)

*Primary Examiner* — Jayesh A Patel
(74) *Attorney, Agent, or Firm* — Sprinkle IP Law Group (57) ABSTRACT

Disclosed is an effective domain name defense solution in which a domain name string may be provided to or obtained by a computer embodying a visual domain analyzer. The domain name string may be rendered or otherwise converted to an image. An optical character recognition function may be applied to the image to read out a text string which can then be compared with a protected domain name to determine whether the text string generated by the optical character recognition function from the image converted from the domain name string is similar to or matches the protected domain name. This visual domain analysis can be dynamically applied in an online process or proactively applied in an offline process to hundreds of millions of domain names.

20 Claims, 5 Drawing Sheets

(56) References Cited

U.S. PATENT DOCUMENTS

| | | | | |
|---|---|---|---|---|
| 2005/0044294 | A1* | 2/2005 | Vo | H03M 7/30 |
| | | | | 710/68 |
| 2008/0010683 | A1* | 1/2008 | Baddour | H04L 63/1441 |
| | | | | 726/24 |
| 2010/0057536 | A1* | 3/2010 | Stefik | G06Q 50/01 |
| | | | | 705/14.71 |
| 2010/0217781 | A1* | 8/2010 | Benhadda | G06F 16/35 |
| | | | | 707/803 |
| 2013/0302775 | A1* | 11/2013 | King | G09B 7/00 |
| | | | | 434/362 |
| 2014/0297261 | A1* | 10/2014 | Sayers | G06F 40/279 |
| | | | | 704/9 |
| 2015/0278188 | A1* | 10/2015 | Aras | G06F 16/955 |
| | | | | 709/245 |
| 2017/0034087 | A1* | 2/2017 | Borenstein | H04L 51/08 |
| 2017/0371857 | A1* | 12/2017 | Chowdhury | G06F 40/226 |
| 2017/0371862 | A1* | 12/2017 | Chowdhury | G06F 40/30 |
| 2019/0238576 | A1* | 8/2019 | Weber | H04L 63/1425 |

OTHER PUBLICATIONS

Internationalized domain name, Wikipedia, retrieved from https://en.wikipedia.org/wiki/Internationalized_domain_name, printed Jan. 30, 2017, 5 pgs.

IDN homograph attack, Wikipedia, retrieved from https://en.wikipedia.org/wiki/IDN_homograph_attack, printed Jan. 30, 2017, 9 pgs.

Unicode Utilities: Confusables, Wikipedia, retrieved from http://unicode.org/cldr/utility/confusables.jsp, printed Feb. 10, 2017, 2 pgs.

* cited by examiner

VISUAL DOMAIN DETECTION SYSTEMS AND METHODS

TECHNICAL FIELD

This disclosure relates generally to domain name management and digital brand protection in distributed network computing environments. More particularly, this disclosure relates to systems and methods for detection of domain names that visually appear to be the same as or similar to protected domain names.

BACKGROUND OF THE RELATED ART

A "domain name" refers to a name of a realm of administrative autonomy, authority, or control on the Internet. Domain names, which may also be referred to as "domains" herein, are formed by the rules and procedures of a hierarchical decentralized naming system referred to as the Domain Name System (DNS).

The hierarchical DNS is organized into zones of authority. The Internet Corporation for Assigned Names and Numbers (ICANN) is the authority that manages the top-level development and architecture of the Internet domain name space. Each domain name has one or more parts that are technically referred to as labels. The domain name hierarchy descends from the right label to the left label, delimited by dots, such that the right-most label in a domain name denotes the top-level domain (TLD). For example, the domain name "www.company.com" belongs to the top-level domain ".com," "company" is a subdomain of ".com" (and hence a second-level domain name) and "www" is a subdomain of "company.com" (and hence a third-level domain name).

Any individual or entity may register a domain name with a registrar. However, such a domain name registration does not confer any legal ownership of the domain name, only an exclusive right of use for a particular duration of time. The use of domain names in commerce may subject them to trademark law. For example, trademark dilution is a trademark law concept giving the owner of a famous trademark standing to forbid others from using that mark in a way that would lessen its uniqueness.

Today's Internet technologies, including domain name registration processes, DNS servers, and browser applications, do not provide famous brand name owners with sufficient brand/domain protection on the Internet. Consequently, there is room for technical innovations and improvements.

SUMMARY OF THE DISCLOSURE

An object of the invention is to provide an innovative, effective, proactive, and extensible solution that can address a previously unmet need to provide famous brand name owners with sufficient domain protection on the Internet. According to embodiments, this goal can be realized in new visual domain detection systems and methods disclosed herein.

In some embodiments, a domain name string may be provided to or obtained by a computer embodying a visual domain analyzer disclosed herein. The domain name string may be collected or generated by a data source over a network. The domain name string may be rendered or otherwise converted to an image.

In some embodiments, prior to converting the domain name string into an image, one or more determinations may be made. For example, the visual domain analyzer may operate to parse the domain name string and determine whether the domain name string is an internationalized domain name. In some embodiments, this can be achieved by checking whether an ASCII representation consisting of a prefix such as "xn--" is present in the domain name string.

In some embodiments, an internationalized domain name may be decoded into a specific encoding format such as UTF8. This process may produce binary characters which can be used, for instance, by a draw function, to generate an image such as a Portable Network Graphics file.

In some embodiments, an optical character recognition function may be applied to the image to read out a text string which may then be compared with a protected domain name to determine whether the text string generated by the optical character recognition function from the image converted from the domain name string is similar to or matches the protected domain name. In some embodiments, this determination may be made utilizing a string similarity measure. As a non-limiting example, the string similarity measure may comprise a bigram distance between the domain name string and the protected domain name. In some embodiments, a result from the visual domain analysis can be communicated to a computing device over the network.

In one embodiment, a system may comprise at least one processor, at least one non-transitory computer-readable storage medium, and stored instructions translatable by the at least one processor to perform a method substantially as described herein. Another embodiment comprises a computer program product having at least one non-transitory computer-readable storage medium storing instructions translatable by at least one processor to perform a method substantially as described herein. Numerous other implementations may also be possible.

Embodiments disclosed herein can provide many technical advantages. For example, current web browsers do not have viable defense methods against domain name spoofing. Embodiments disclosed herein can fill this void in an effective and proactive manner, providing brand/domain owners a technical solution to preemptively identify candidate domains that may be visually similar or even look identical to their protected domain names. Furthermore, this visual domain analysis can be dynamically applied in an online process or proactively applied in an offline batch process to hundreds of millions of domain names.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The DNS translates a domain name, which consists of a human-readable identification string of ASCII characters, to a corresponding numerical Internet Protocol (IP) address where a desired network resource such as a home page of a web site is located (usually on a web server). The web server sends the information to the web browser that is requesting the home page. The web browser renders the home page and display it on a computer on which the web browser runs.

Today's web browsers do not implement very advanced defense methods against improperly named or "spoofed" domains. A web browser typically does not detect whether a domain name visually looks similar to, but is technically different from, another domain name. Rather, any time a domain is determined (manually by a programmer or programmatically by a machine) to be malicious, it is added to their black list. It does not matter whether it is an international domain name or not.

In this context, a technical problem arises from supporting internationalized domain names (IDNs) on the Internet. An IDN refers to a domain name that has at least one label that is displayed, in whole or in part, in software applications such as a web browser in a language-specific script or alphabet. Examples of internationalized character sets include the Latin alphabet-based characters with diacritics or ligatures such as French, Arabic, Chinese, Cyrillic, Tamil, and Hebrew. IDNs are generally stored in the DNS as ASCII (American Standard Code for Information Interchange) strings. ASCII codes represent text in computers, so ASCII strings represent text strings.

Domain names can be attacked in many ways. A type of domain name attack is referred to as typosquatting in which a domain name that looks similar to a more established domain name is used to deceive or fool a user. A typosquatting domain name may be a variant of the more established domain name, with a slight change such as a capital case of "I" or "1" may be used instead of a lower case "l"; a hyphen may be added; a small typo may be introduced; an extra character may be omitted or added; or the number "0" may be used instead of a lower case "o"—the variations can be limitless.

A famous brand/domain may be particularly vulnerable to domain name attacks, particularly when many sought to register domain names that look similar or even visually indistinguishable when character(s) from a different language is or are used in conjunction with English/Latin characters. For example, the Cyrillic letters "A," "B," "C," "E," "K," "M," "H," "O,", "P," "T," "X," etc. are visually indistinguishable from their corresponding English letters. Such similar- or identical-looking characters are referred to as homographs. The registration of a homographic domain name that looks similar to a more established domain name is referred to as an IDN homograph attack and it is used to deceive or fool a user. For this reason, homographs are assigned different Unicode, which is a computing industry standard for the consistent encoding, representation, and handling of text expressed in most of the world's writing systems.

The use of Unicode in domain names allows for people to create domains in their native languages. However, as described above, these different languages have characters that can look very similar, if not identical, to English characters. This allows attackers to create very tricky domains that users would not be able to easily differentiate. An example is domain "Google.com" which looks like "google.com" but is technically an ASCII string (rendered in Punycode) as "xn--oogle-wmc.com." If one were to analyze this ASCII string alone, it would be difficult to determine whether "xn--oogle-wmc.com" is actually trying to imitate "google.com."

ASCII spoofing is of concern to legitimate domains with little if any current methods of defense. Homographic Universal Resource Locators (URLs) that house malicious software can still be distributed through e-mail, social media, or other web sites without being detected until a user actually clicks the link. The user's web browser will dutifully contact the web server hosting the intentionally deceiving "fake" domain as directed by the link and will proceed to load data from the fake domain.

Suppose "Company.com" is an established domain for a famous "Company" and "company.com" with a homograph "a" mixed in with an otherwise English word is a spoofing/phishing site. A web browser will not know the difference between these two domain names. There is no intelligence in the web browser's function—it will respond to a user selecting a link, resolve that link to a network resource IP address, render the network resource (e.g., a web page), and display the rendered document. If the web browser determines that "company.com" is a phishing site, for example, by referencing its black list (into which the site must have been previously added), then the browser may inform the user that the site does not seem to be legitimate. By this time, the web browser may already begin loading the page from the phishing web site "company.com" and/or the potentially malicious software may have already been downloaded onto the user's computer.

Embodiments disclosed herein provide a technical solution that is independent of browser functions. In some embodiments, domain protection analyses may be performed in an offline process or an online process in real time to ascertain whether there is any registered domain name that is similar to protected domain names (which, in some embodiments, are referred to as "seeds"). In an offline process, no browser function and no user interaction may be needed.

Figure 1:
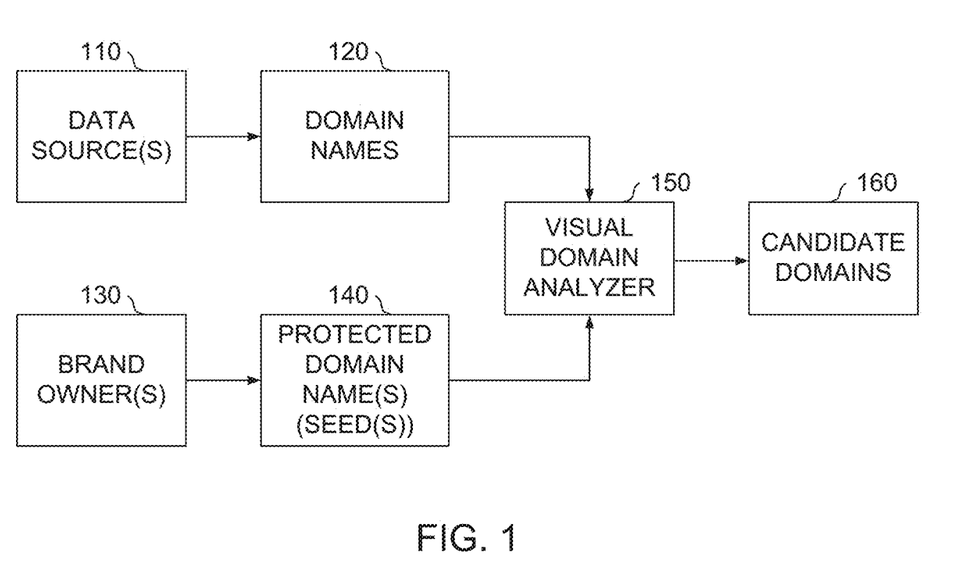
FIG. 1 depicts a flow diagram showing input and output examples of a visual domain analyzer according to some embodiments disclosed herein.

In some embodiments, the technical solution comprises a visual domain analyzer. FIG. 1 depicts a flow diagram showing input and output examples of a visual domain analyzer according to some embodiments disclosed herein.

In the example of FIG. 1, domain names 120 may be obtained or received from data source(s) 110. These domain names 120 may be registered with one or more registrars, but may or may not actually be in operation or considered "live" on the Internet. Data source(s) 110 may collect (e.g., via data gathering modules or crawlers) or otherwise obtain domain names 120 from the Internet. Data source(s) 110 can include data providers, domain name registration service providers, registrars, etc. In an online process, described below, data source(s) 110 may include an end user who may wish to check whether a domain name (whether it has been registered or not) may be similar or may match a protected domain name. In further embodiments, data source(s) 110 may include an email message, social media content, or other online or internet content containing domain names or "links" to domain names.

As a non-limiting example, domain names 120 may comprise hundreds of millions of domain names. In some embodiments, domain names 120 may be obtained or received from data source(s) 110 on-demand or at a predetermined time interval. In one embodiment, domain names 120 may be obtained or received from data source(s) 110 daily.

As illustrated in FIG. 1, brand owner(s) 130 may provide a list of their domain name(s) or seed(s) 140 to visual domain analyzer 150. In some embodiments, visual domain analyzer 150 may compare domain names 120 and protected domain name(s) 140, determine which ones violate the security policies of brand owner(s) 130, and generate a result or output 160 containing candidate domains that are determined by visual domain analyzer 150 as being visually similar to protected domain name(s) 140. This process is further descried below with reference to FIGS. 2A and 2B.

Figure 2A:
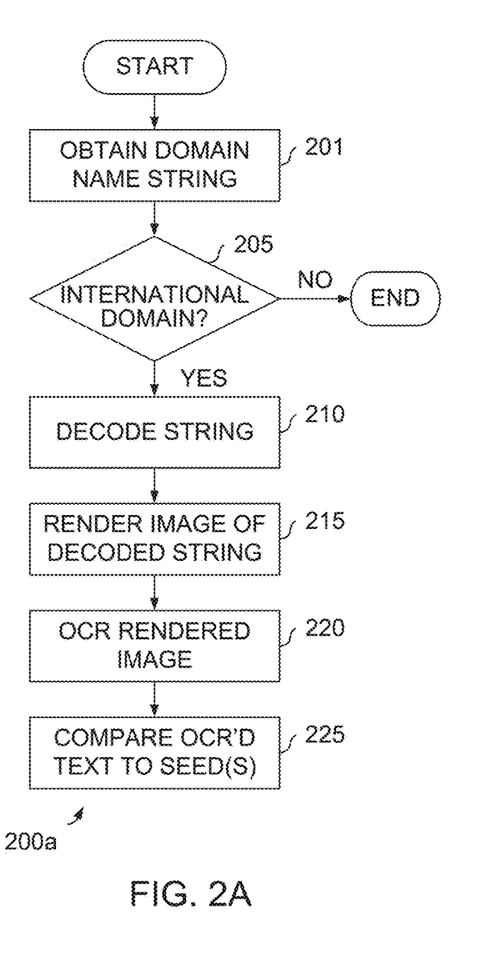
FIG. 2A is a flow chart illustrating an example process performed by a visual domain analyzer, according to some embodiments.

FIG. 2A is a flow chart illustrating example process 200a performed by a visual domain analyzer, according to some embodiments. In this example, process 200a may begin with obtaining or receiving a domain name string (e.g., from a file containing domain names 120 provided by data source(s) 110 as shown in FIG. 1) (201).

Process 200a may parse the domain name string and determine whether it is an IDN (205). In the DNS, IDNs have a specific format and a specific protocol for encoding. In general, an IDN has an ASCII representation consisting of the prefix "xn--" followed by the Punycode translation of the Unicode representation of the language-specific alphabet or script glyphs. Punycode is a way to represent Unicode with the limited character subset of ASCII supported by the DNS.

As a non-limiting example, process 200a may parse the domain name string and, depending upon whether the prefix "xn--" can be found in the domain name string, determine whether it is an IDN. If the domain name string is not an IDN, process 200a ends. If so, process 200a proceeds to decode the IDN (210).

In some embodiments, this can be done using an IDNA decode function. IDNA refers to a protocol called Internationalizing Domain Names in Applications in which an IDN specifically refers to any domain name consisting only of labels to which the IDNA ToASCII algorithm can be successfully applied. IDNA specifies how the conversion between names written in non-ASCII characters and their ASCII-based representation is performed using ToASCII and ToUnicode algorithms. Skilled artisans appreciate that these algorithms are not applied to the domain name as a whole, but rather to individual labels. For the sake of brevity, they are collectively referred to as the IDNA decode function. The decoding function of IDNA library is known to those skilled in the art and thus is not further described herein. Any suitable decoding function can be utilized.

In some embodiments, the IDNA decode function is used by the visual domain analyzer to covert an ASCII string to Unicode. As a non-limiting example, each identified "xn--" string can be converted into a binary characters string in an appropriate format such as UTF8. Other character encoding formats may also be possible.

Figure 2B:
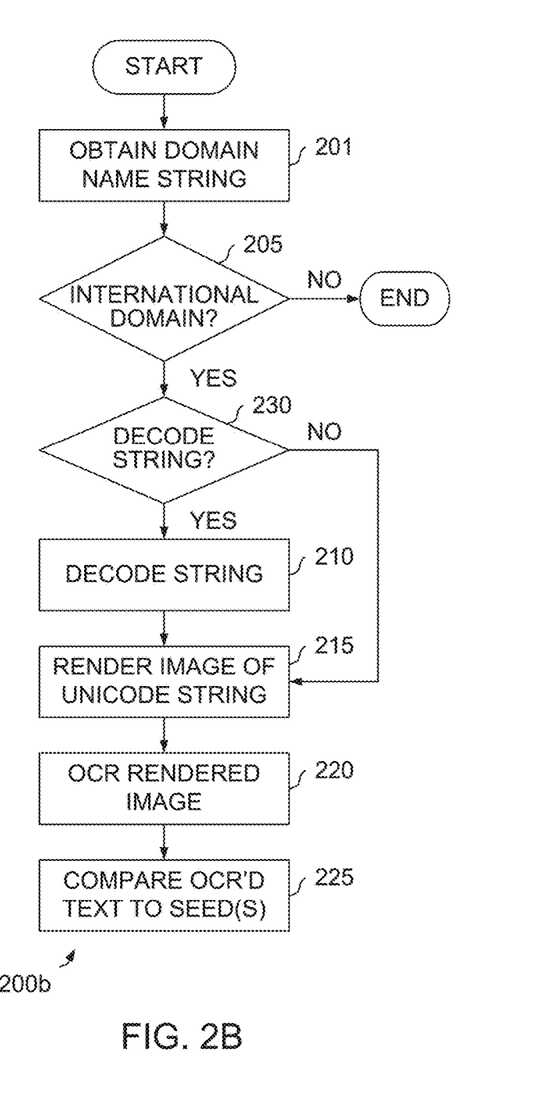
FIG. 2B is a flow chart illustrating another example process performed by a visual domain analyzer according to some embodiments disclosed herein.

In some embodiments, a domain name string provided to a visual domain analyzer may already be in a suitable Unicode format such as UTF8 format. In those cases, as illustrated in FIG. 2B, process 200b may determine whether it is necessary to run the IDNA decode function (230). If process 200b determines that the IDNA decode function is not necessary, process 200b may skip the IDNA decode function, as illustrated in FIG. 2B.

In both FIGS. 2A and 2B, the Unicode string (in binary characters) is then rendered as an image (215). In some embodiments, an Image Draw function may be utilized. For example, font types and character encoding may be provided to the Image Draw function which then draws those characters and generates an image file.

As a non-limiting example, the image file may have an image file format such as the Portable Network Graphics (.png) format. Other image formats are also possible, so long as they are supported by the optical character recognition (OCR) function used by the visual domain analyzer to read the text in the image (220). In this disclosure, OCR refers to the electronic conversion of images, which were rendered from binary characters (which, in turn, may be decoded from ASCII codes), into machine-encoded "OCR'd" text. The OCR'd text is then compared with seed(s) to determine whether they are similar (225).

Following the example of "Google.com" described above, this domain name string is determined to be an IDN by reference to its IDN format beginning with the prefix "xn--" (that is, "Google.com" will be represented to DNS as "xn--oogle-wmc.com"). At step 210, "xn--oogle-wmc.com" will be rendered as the UTF8 characters "Google.com" which will then be rendered in step 215 as an image "Google.com." An OCR function is applied to this image to read out a text string "google.com" (in ASCII format). The text string "google.com" produced by the OCR function is compared with a protected domain name which, in this case, is the real google.com.

It can be seen from this example, the output from the visual domain analyzer can sometimes match the protected domain name exactly—they are visually indistinguishable, even though they are technically different (e.g., they have different character codes according to Unicode). In this example, the initial "G" of "Google.com" is an international coded letter in Unicode that is distinct from an ASCII "g." After going through the visual domain analyzer it is determined that when the international "G" is converted to an ASCII "g" that the IDN "Google.com" is a match or spoof of the seed "google.com."

Many string similarity measures may be utilized by the visual domain analyzer to determine whether the OCR'd text is similar to or matches a protected domain name. For example, the Levenshtein distance, also known as edit distance (EDIT), is defined as the minimum number of elementary edit operations needed to transform one string into another. Another approach relies on finding the length of the longest common subsequence (LCS) of the two strings. Other similarity measures are based on the number of shared n-grams, i.e., substrings of length n. In the fields of computational linguistics and probability, an n-gram is a contiguous sequence of n items from a given sequence of text or speech. An n-gram of size 2 is referred to as a bigram. Skilled artisans appreciate that the similarity or closeness between two text strings from a finite alphabet can be algorithmically quantified using a ratio of bigram similarity and distance. This similar measure can have a configurable tolerance that depends on the length of the strings under comparison. For example, shorter strings would have a higher requirement for closeness; whereas, longer strings may have a higher tolerance for closeness. Other closeness measures may also be possible.

In some embodiments, the visual domain analyzer is operable to process all the domain names (e.g., domain names 120) that it received (e.g., from data source(s) 110) as described above and generate a list, result, or report (collectively referred to herein as "output") of candidate domains (e.g., candidate domains 160) that are deemed by the visual domain analyzer (or another component of a domain protection system, described below) as similar or close to one or more protected domain names (e.g., seed(s) 140). In some embodiments, the output may be communicated to an entity or entities for which domain protection is sought (e.g., brand owner(s) 130). The entity or entities may decide to take action against the candidate domains identified in the output (e.g., sending a cease and desist letter to the owner(s) of the offending candidate domains to stop them from improperly directing network traffic to their sites).

Figure 3:
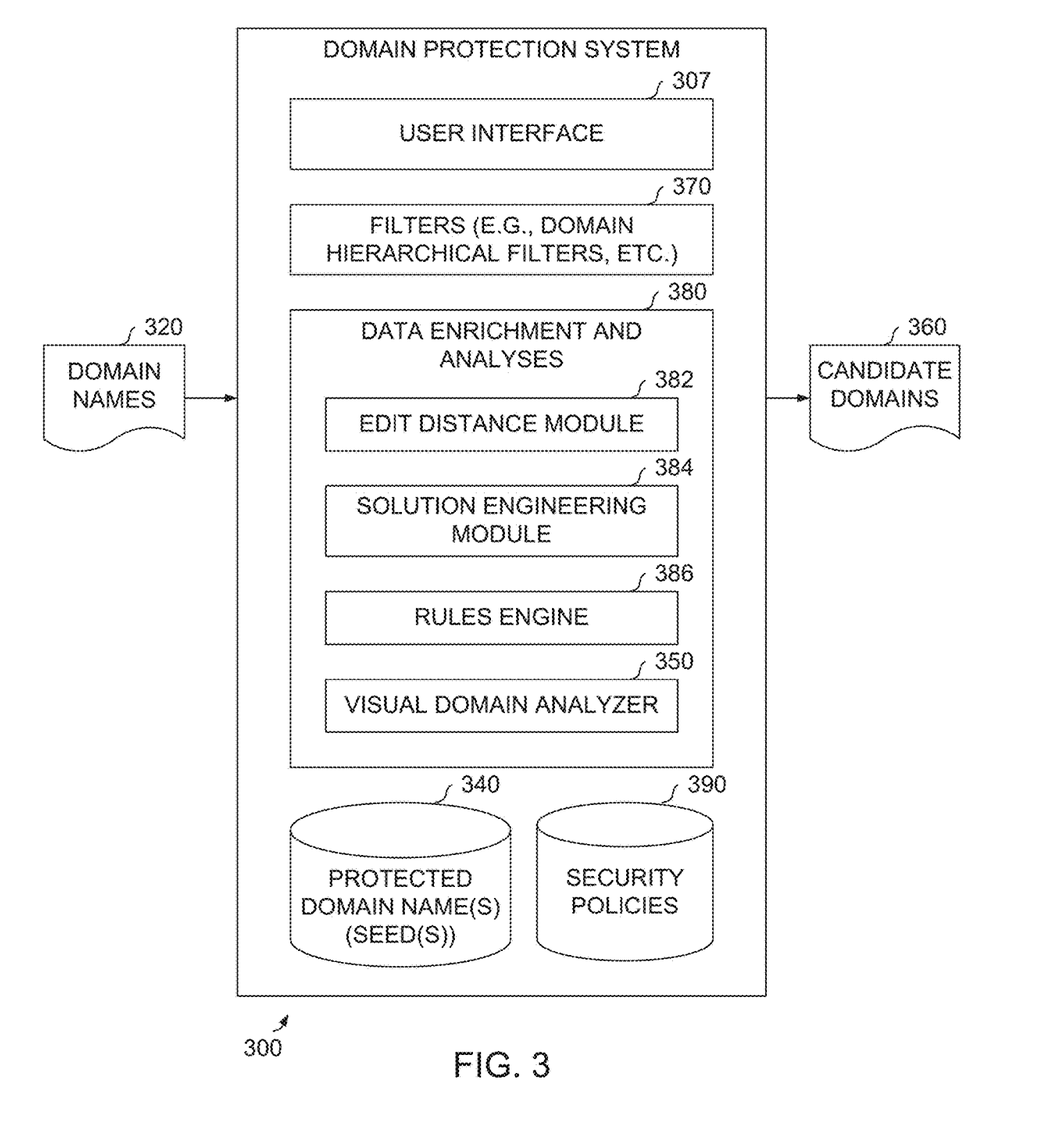
FIG. 3 depicts a diagrammatic representation of an example of a domain protection system in which embodiments of a visual domain analyzer disclosed herein may be implemented.

Skilled artisans appreciate that embodiments of a visual domain analyzer described above can be implemented in many ways. FIG. 3 depicts a diagrammatic representation of an example of a domain protection system in which embodiments of a visual domain analyzer disclosed herein may be implemented.

In the example of FIG. 3, visual domain analyzer 350 may be implemented as part of domain protection system 300. Similar to embodiments described above with reference to FIG. 1, domain protection system 300 may obtain or receive domain names 320 from data source(s), process domain names 320, determine candidate domains 360 that are similar or close to protected domain name(s) 340, based on security policies 390 associated with protected domain name(s) 340. Security policies 390 may be implemented in many ways, for instance, depending upon requirements associated with protected domain name(s) 340. Example requirements may be defined by rules governing anti-phishing, brand violation, domain detection, etc. Rules may be specified by administrators responsible for protected domain name(s) 340. In some embodiments, these administrators may work for an entity or entities seeking domain protection for protected domain name(s) 340 and may utilize a user interface or portal (e.g., user interface 307) provided by domain protection system 300 to communicate with domain protection system 300.

In some embodiments, domain protection system 300 may further comprise filters 370. Filters 370 may include domain hierarchical (tree) filters that comprise code for programmatically examining domains and comparing against protected domain name(s) 340. This can be done for one or more labels in each domain name. As a non-limiting example, only the second-level label in each domain name may be compared. Optionally, the top-level label may also be compared.

Filters 370 can serve as a "first pass" to filter the hundreds of millions of domain names such that domain names are passed to data enrichment and analyses 380 if they meet certain "closeness" requirement. Skilled artisans understand that various closeness measures, including those described above, can be utilized for this filtering process. This has a technical effect of increasing the performance of visual domain analyzer 350 in particular and domain protection system 300 in general, since not all domain names 320 may be similar to protected domain name(s) 340.

In some embodiments, data enrichment and analyses 380 may comprise edit distance module 382, solution engineering module 384, and rules engine 386, in addition to visual domain analyzer 350. Data enrichment and analyses 380 may include other components not shown in FIG. 3.

In some embodiments, edit distance module 382 may be particularly configured for examining a domain name and measuring the distance between the domain name and a seed. This can be done in many ways, for instance, performing vowel swaps of the names, calculating the Levenshtein distance, etc.

In some embodiments, solution engineering module 384 may take the output produced by edit distance module 382 and determine further features and/or constraints in the names under comparison. For example, solution engineering module 384 may be particularly configured for considering words in a domain name relative to a product or service vertical (e.g., travel) on the Internet. If a domain name is consistent with attacks that generally occur in the same vertical as the seed, the domain name is singled out to rules engine 386. This has a technical effect of creating a stronger signal for analysis by rules engine 386.

In some embodiments, rules engine 386 is particularly configured for determining a classification determination based on the strength of the signal from solution engineering module 384. In some embodiments, candidate domains 360 may be determined based on their corresponding classification determined by rules engine 386. Various classification schemes may be utilized. In some embodiments, candidate domains 360 may comprise a subset of domain names 320 having the same class.

Additionally or alternatively, in some embodiments, visual domain analyzer 350 may be utilized to identify a portion of domain names 320 that are visually similar to protected domain name(s) 340. This can ensure that, even if domain names that are technically different (e.g., IDNs having the prefix "xn--" as described above), if they are visually similar to protected domain name(s) 340, they will be identified by visual domain analyzer 350 and included in candidate domains 360.

Figure 4:
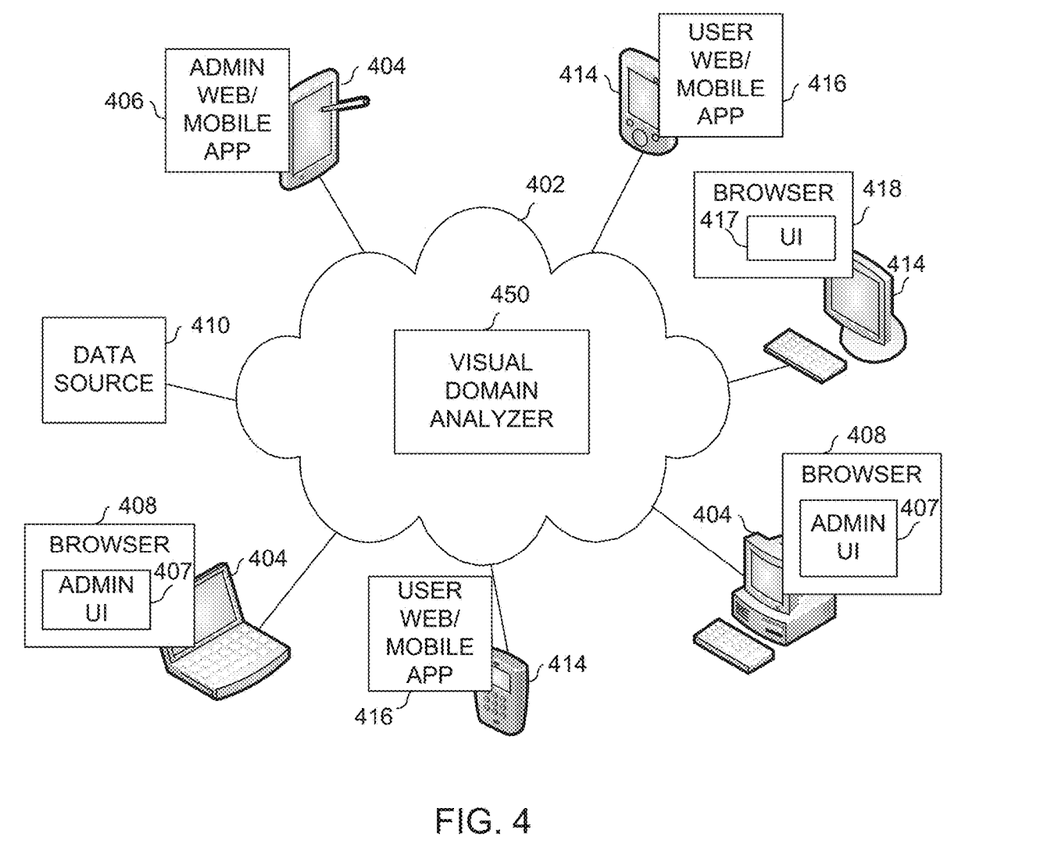
FIG. 4 depicts a diagrammatic representation of an example of a distributed computer network in which embodiments of a visual domain analyzer disclosed herein may be implemented.

As another non-limiting example, FIG. 4 depicts a diagrammatic representation of how embodiments of a visual domain analyzer described above can be implemented. In the example of FIG. 4, visual domain analyzer 450 operates in distributed network or cloud computing environment 402.

As described above, visual domain analyzer 450 can be part of a larger domain protection system or it can operate as a standalone service hosted on a server machine.

In an offline process, visual domain analyzer 450 can obtain or receive domain names from data source(s) 410. Visual domain analyzer 450 may obtain or receive protected domain name(s) or seed(s) from their administrators (e.g., via administrative web or mobile application 406 or administrative user interface 407 running in web browser 408 on an administrator's computing device 404). Visual domain analyzer 450 may perform the visual domain analysis described above. The output from visual domain analyzer 450 may be provided to and/or accessible by administrative users in many ways (e.g., via email, via a portal provided by the domain protection system, via a visual domain analyzer user interface, etc.). As explained above, the visual domain analysis itself does not need to involve any browser function and/or user interaction. Rather, it can proactively identify candidate domain names on the Internet similar to protected domain names, even if the candidate domains are not in use. In other words, embodiments of the visual domain analyzer disclosed herein can provide a defense solution that current web browsers are unable to provide to brand/domain owners.

In an online process, visual domain analyzer 450 may be provided as a service that takes an input domain name string (in ASCII or Unicode representation) provided by a user or data source, converts it into an image, applies OCR to the image, gets an OCR'd text string, and returns the result (e.g., via administrative web or mobile application 406 or administrative user interface 407 running in web browser 408 on an administrator's computing device 404, or user web or mobile application 416 or user interface 417 running in web browser 418 on a user's computing device 414). This process can be performed dynamically to proactively identify potentially deceiving domain names on the Internet that are visually identical or similar to a seed or seeds. In one embodiment, the seed(s) can also be provided to visual domain analyzer 450 dynamically. In response, a list of similar domain name(s) may be programmatically automatically determined and provided over network 402 by visual domain analyzer 450.

Figure 5:
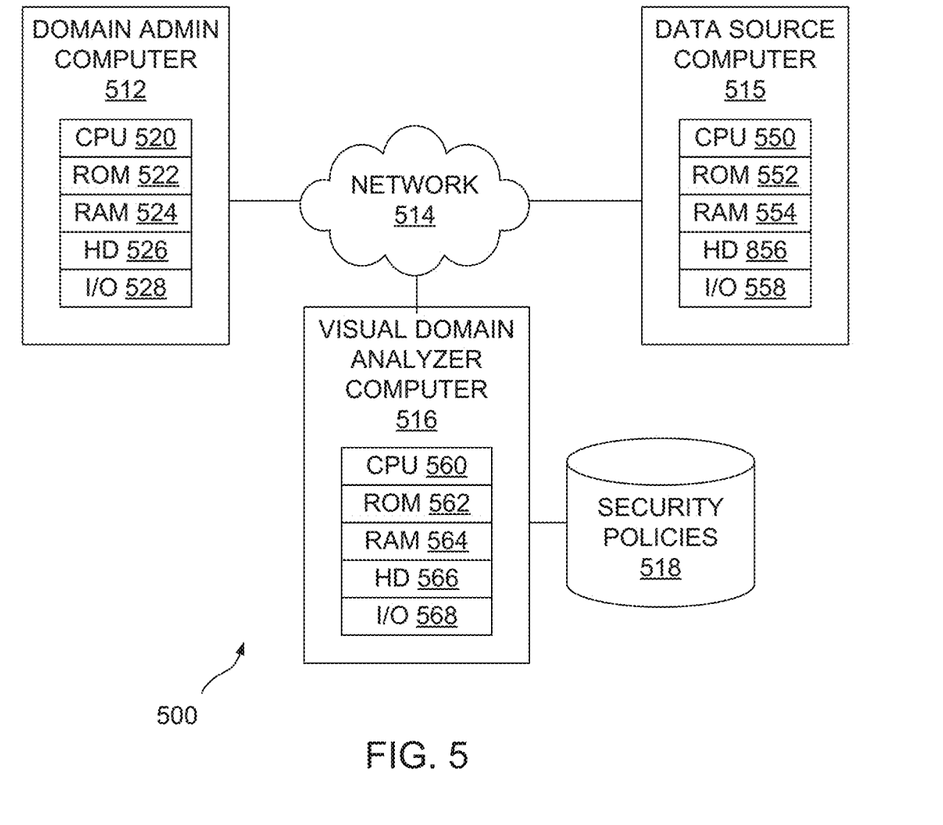
FIG. 5 depicts a diagrammatic representation of an example of a distributed network computing environment where embodiments disclosed may be implemented.

FIG. 5 depicts a diagrammatic representation of an example of a distributed network computing environment where embodiments disclosed may be implemented. In the example illustrated, network computing environment 500 includes network 514 that can be bi-directionally coupled to user devices such as domain administration computer 512, data source/provider computer 515, and visual domain analyzer server computer 516. Visual domain analyzer server computer 516 can be bi-directionally coupled to database 518 storing security policies such as those described above. Network 514 may represent a combination of wired and wireless networks that network computing environment 500 may utilize for various types of network communications known to those skilled in the art.

For the purpose of illustration, a single system is shown for each user device 512, provider computer 515, and server computer 516. However, within each of user device 512, provider computer 515, and server computer 516, a plurality of networked devices and computers alike (not shown) may be interconnected to each other over network 514. For example, a plurality of user devices 512 and a plurality of provider computers 515 may be coupled to network 514. User devices 512 may include data processing systems for communicating with server computer 516.

User device 512 can include central processing unit ("CPU") 520, read-only memory ("ROM") 522, random access memory ("RAM") 524, hard drive ("HD") or storage memory 526, and input/output device(s) ("I/O") 528. I/O 528 can include a keyboard, monitor, printer, electronic pointing device (e.g., mouse, trackball, stylus, etc.), or the like. User device 512 can include a desktop computer, a laptop computer, a personal digital assistant, a cellular phone, or nearly any network-enabled device capable of communicating over a network. Provider computer 515 may be similar to user computer 512 and can comprise CPU 550, ROM 552, RAM 554, HD 556, and I/O 558.

Likewise, server computer 516 may include CPU 560, ROM 562, RAM 564, HD 566, and I/O 568. Server computer 516 may include one or more backend systems configured for providing a variety of domain protection services to user devices 512 over network 514. Database 518 may comprise at least one data storage device storing security policies and/or rules utilized by server computer 516. Many other alternative configurations are possible and known to skilled artisans.

Each of the computers in FIG. 5 may have more than one CPU, ROM, RAM, HD, I/O, or other hardware components. For the sake of brevity, each computer is illustrated as having one of each of the hardware components, even if more than one is used. Each of computers 512, 515, and 516 is an example of a data processing system. ROM 522, 552, and 562; RAM 524, 554, and 564; HD 526, 556, and 566; and data store 518 can include media that can be read by CPU 520, 550, or 560. Therefore, these types of memories include non-transitory computer-readable storage media. These memories may be internal or external to computers 512, 515, or 516.

Portions of the methods described herein may be implemented in suitable software code that may reside within ROM 522, 552, or 562; RAM 524, 554, or 564; or HD 526, 556, or 566. In addition to those types of memories, the instructions in an embodiment disclosed herein may be contained on a data storage device with a different computer-readable storage medium, such as a hard disk. Alternatively or additionally, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips.

Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc.

Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for visual domain detection, comprising:
   obtaining, by a computer, a domain name string, the domain name string collected or generated by a data source over a network, the computer comprising at least one processor and at least one non-transitory computer-readable medium;
   converting, by the computer, the domain name string for visual domain detection processing, the converting comprising:
   determining whether to decode the domain name string based on a format of the domain name string;
   responsive to a determination to decode the domain name string, decoding the domain name string into binary characters; and
   rendering the binary characters as an image;
   applying, by the computer, an optical character recognition (OCR) function to the image, the applying the OCR function to the image generating a text string that is a domain name set of characters;
   comparing, by the computer, the text string generated by the OCR function with a protected domain name;
   determining, by the computer utilizing a string similarity measure, whether the text string generated by the OCR function from the image converted from the domain name string is similar to or matches the protected domain name, the string similarity measure comprising a bigram distance between the domain name string and the protected domain name; and
   communicating, by the computer, a result from the determining to a computing device over the network.

2. The method according to claim 1, wherein the computer determines prior to the converting whether the domain name string is an internationalized domain name.

3. The method according to claim 2, wherein the computer determines whether the domain name string is an internationalized domain name by parsing the domain name string and determining whether an ASCII representation consisting of a prefix is present in the domain name string.

4. The method according to claim 3, wherein the prefix comprises "xn--".

5. The method according to claim 2, wherein the computer decodes the internationalized domain name into binary characters, and wherein the computer renders the binary characters into an image file utilizing a draw function.

6. The method according to claim 5, wherein the binary characters are in UTF8 format.

7. The method according to claim 1, further comprising:
   determining, based on one or more words in the text string, whether the domain name string belongs to same product or service vertical on the Internet as the protected domain name; and
   responsive to the domain name string and the protected domain name belonging to the same product or service vertical on the Internet, providing the domain name string to a rules engine for analysis.

8. A system for visual domain detection, comprising:
   a computer embodying a visual domain analyzer, the computer comprising at least one processor and at least one non-transitory computer-readable medium storing instructions translatable by the at least one processor to perform:
   obtaining a domain name string, the domain name string collected or generated by a data source over a network;
   converting the domain name string for visual domain detection processing, the converting comprising:
   determining whether to decode the domain name string based on a format of the domain name string;
   responsive to a determination to decode the domain name string, decoding the domain name string into binary characters; and
   rendering the binary characters as an image;
   applying an optical character recognition function (OCR) to the image, the applying the OCR function to the image generating a text string that is a domain name set of characters;
   comparing the text string generated by the OCR function with a protected domain name;
   determining, utilizing a string similarity measure, whether the text string generated by the OCR function from the image converted from the domain name string is similar to or matches the protected domain name, the string similarity measure comprising a bigram distance between the domain name string and the protected domain name; and
   communicating a result from the determining to a computing device over the network.

9. The system of claim 8, wherein the instructions are further translatable by the at least one processor to determine prior to the converting whether the domain name string is an internationalized domain name.

10. The system of claim 9, wherein the instructions are further translatable by the at least one processor to determine whether the domain name string is an internationalized domain name by parsing the domain name string and determining whether an ASCII representation consisting of a prefix is present in the domain name string.

11. The system of claim 10, wherein the prefix comprises "xn--".

12. The system of claim 9, wherein the instructions are further translatable by the at least one processor to decode the internationalized domain name into binary characters, and wherein the instructions are further translatable by the at least one processor to render the binary characters into an image file utilizing a draw function.

13. The system of claim 12, wherein the binary characters are in UTF8 format.

14. The system of claim 8, wherein the instructions are further translatable by the at least one processor for:
- determining, based on one or more words in the text string, whether the domain name string belongs to same product or service vertical on the Internet as the protected domain name; and
- responsive to the domain name string and the protected domain name belonging to the same product or service vertical on the Internet, providing the domain name string to a rules engine for analysis.

15. A computer program product for visual domain detection, the computer program product comprising at least one non-transitory computer-readable medium storing instructions translatable by at least one processor to perform:
- obtaining a domain name string, the domain name string collected or generated by a data source over a network;
- converting the domain name string for visual domain detection processing, the converting comprising:
  - determining whether to decode the domain name string based on a format of the domain name string;
  - responsive to a determination to decode the domain name string, decoding the domain name string into binary characters; and
  - rendering the binary characters as an image;
- applying an optical character recognition function (OCR) to the image, the applying the OCR function to the image generating a text string that is a domain name set of characters;
- comparing the text string generated by the OCR function with a protected domain name;
- determining, utilizing a string similarity measure, whether the text string generated by the OCR function from the image converted from the domain name string is similar to or matches the protected domain name, the string similarity measure comprising a bigram distance between the domain name string and the protected domain name; and
- communicating a result from the determining to a computing device over the network.

16. The computer program product of claim 15, wherein the instructions are further translatable by the at least one processor to determine prior to the converting whether the domain name string is an internationalized domain name.

17. The computer program product of claim 16, wherein the instructions are further translatable by the at least one processor to determine whether the domain name string is an internationalized domain name by parsing the domain name string and determining whether an ASCII representation consisting of a prefix is present in the domain name string.

18. The computer program product of claim 17, wherein the prefix comprises "xn--".

19. The computer program product of claim 16, wherein the instructions are further translatable by the at least one processor to decode the internationalized domain name into binary characters, and wherein the instructions are further translatable by the at least one processor to render the binary characters into an image file utilizing a draw function.

20. The computer program product of claim 15, wherein the instructions are further translatable by the at least one processor for:
- determining, based on one or more words in the text string, whether the domain name string belongs to same product or service vertical on the Internet as the protected domain name; and
- responsive to the domain name string and the protected domain name belonging to the same product or service vertical on the Internet, providing the domain name string to a rules engine for analysis.

* * * * *